US005408699A

United States Patent [19]

Yamashita et al.

[11] Patent Number: 5,408,699

[45] Date of Patent: Apr. 18, 1995

[54] PORTABLE RADIO EQUIPMENT HAVING A DISPLAY

[75] Inventors: Masayoshi Yamashita; Toshihiro Mori, both of Tokyo, Japan

[73] Assignee: NEC Corporation, Tokyo, Japan

[21] Appl. No.: 327,249

[22] Filed: Oct. 15, 1991

Related U.S. Application Data

[63] Continuation of Ser. No. 360,379, Jun. 2, 1989, abandoned.

[30] Foreign Application Priority Data

Jun. 6, 1988 [JP] Japan ............................... 63-138635

[51] Int. Cl.[6] ............................................... H04B 1/08

[52] U.S. Cl. ...................................... 455/274; 455/90; 455/347; 343/702; 340/825.44

[58] Field of Search .................... 455/89, 90, 128, 129, 455/347, 351, 272, 274; 343/702, 725, 829, 830, 848; 340/825.44

[56] References Cited

U.S. PATENT DOCUMENTS 4,641,366 2/1987 Yokoyama ............................ 455/90
4,642,627 2/1987 Hodsdon ............................... 455/90
4,648,125 3/1987 Brown .................................. 455/90
4,814,776 3/1989 Caci et al. ........................... 343/702
4,876,522 10/1989 Zakman ............................... 455/89
4,894,663 1/1990 Urbish et al. ........................ 343/702
4,937,586 6/1990 Stevens et al. ....................... 343/702
5,048,118 9/1991 Brooks et al. .................... 455/156.1
5,054,120 10/1991 Ushiyama et al. .................. 455/280

FOREIGN PATENT DOCUMENTS 574373 1/1946 United Kingdom .
688306 3/1952 United Kingdom .
944039 12/1963 United Kingdom .
1354719 10/1971 United Kingdom .

*Primary Examiner*—Edward F. Urban
*Attorney, Agent, or Firm*—Ostrolenk, Faber, Gerb & Soffen

[57] ABSTRACT

A structure of a loop antenna installed in a portable radio device having a display prevents the gain of the antenna from being lowered despite the fact that a conductive support member or frame, which fixes the display in place, is located in close proximity to the antenna. The conductive support member plays the role of an antenna element of the loop antenna.

14 Claims, 5 Drawing Sheets

PORTABLE RADIO EQUIPMENT HAVING A DISPLAY

This is a continuation of application Ser. No. 07/360,379, filed on Jun. 2, 1989, abandoned.

BACKGROUND OF THE INVENTION

The present invention relates to portable radio equipment having a display and, more particularly, to the structure of a loop antenna installed in such portable radio equipment which prevents the gain of the antenna from being lowered despite the fact that a conductive support member or frame, which fixes a display in place, is located in close proximity to the antenna.

A modern paging receiver or similar radio equipment having a display has various advanced functions and has a miniature handy configuration. The miniature design of this kind of equipment is accomplished by arranging various elements of the equipment close to each other in a dense configuration on a printed circuit board, For example, a loop antenna and a support frame for fixing an LCD (Liquid Crystal Display) or similar display element are usually positioned in close proximity and in parallel with each other. In general, a higher antenna gain is achievable by: allowing an antenna to occupy as large an area as possible on a printed circuit board. Stated another way, a decrease in the area which an antenna occupies on a printed circuit board invites an increase in loss resistance and thereby a decrease in antenna gain. On the other hand, the support frame is generally made of stainless steel, phosphor bronze or similar conductive metal. Hence, when the support frame and loop antenna are positioned close to each other, a current opposite in direction to a radiation current which flows through the antenna is induced in the support frame to cancel the radiation current. This lowers the antenna gain and thereby the sensitivity of the radio equipment. Therefore, when the metal frame is positioned in the vicinity of and in parallel with the antenna, there has to be provided some implementation for preventing the antenna gain from being lowered. The decrease in antenna gain would be more aggravated if other structural elements having influence on the antenna were also located close to the antenna.

SUMMARY OF THE INVENTION

It is therefore an object of the present invention to provide portable radio equipment having a display which eliminates the decrease in antenna gain ascribable to various structural elements which are located close to an antenna.

It is another object of the; present invention to provide portable radio equipment having a display which allows a conductive support member for fixing a display element to be positioned in close proximity to an antenna without inviting the decrease in antenna gain.

It is another object of the present invention to provide portable radio equipment having a display which is implemented by a minimum number of structural members and is therefore miniature.

It is another object of the present invention to provide generally improved portable radio equipment having a display.

In accordance with the present invention, in radio equipment having a loop antenna, conductive support members supporting a certain structural element of the radio equipment constitute at least a part of the antenna.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

To better understand the present invention, prior art portable radio equipment such as a paging receiver with a display and why the antenna gain in such a receiver is lowered when a metal frame or support member for fixing a display is located close to an antenna will be described with reference to FIGS. 1A, 1B and 2.

Figure 1A:
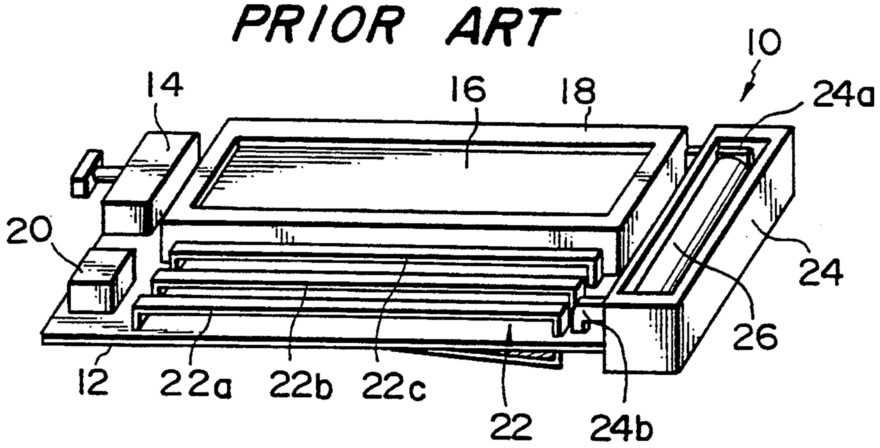
FIG. 1A PRIOR ART
FIG. 1A is a perspective view of a body portion of a prior art paging receiver having a display, a casing and a cover of the paging receiving being omitted for clarity.
Figure 1B:
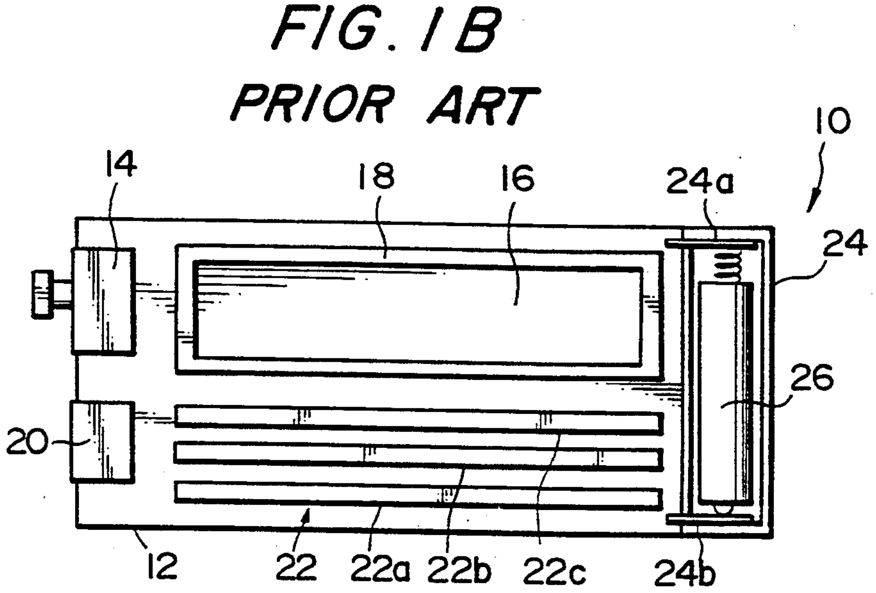
FIG. 1B PRIOR ART
FIG. 1B is a plan view of the paging receiver body portion shown in FIG. 1A.
Figure 2:
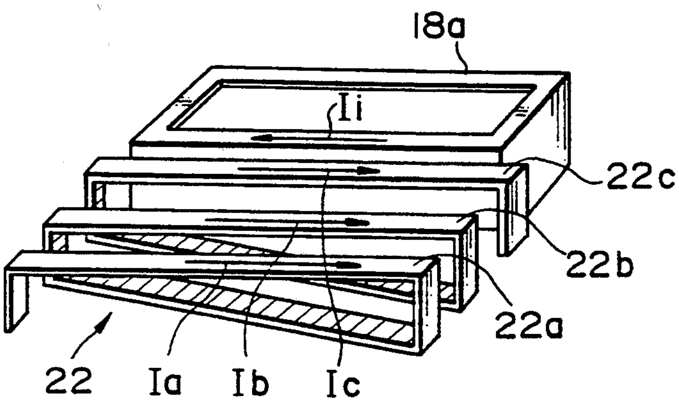
FIG. 2 PRIOR ART
FIG. 2 is a view useful for understanding why the antenna gain is lowered.

Referring to FIGS. 1A and 1B, a body of a prior art paging receiver 10 includes a printed circuit board 12 which is loaded with various structural elements of the receiver 10. Specifically, a power switch 14, an LCD or similar display 16, a metal frame 18, a loudspeaker 20 and an antenna 22 are arranged on the printed circuit board 12. The frame 18 is made of stainless steel, phosphor bronze or similar metal and adapted to fix the display 16 in place. A box-like battery holder 24 has terminals *24a* and *24b* and is located in the vicinity of the printed circuit board 12 to accommodate a battery 26 therein. The antenna 22 is configured as a three-turn loop antenna having antenna elements *22a*, *22b* and *22c*.

The display 16 is securely retained by the meal frame 18 which in turn is located in close proximity to and substantially parallel with the antenna elements *22a*, *22b* and *22c* of the loop antenna 22. In such an arrangement, the frame 18 lowers the gain of the antenna 22 and thereby reduces the sensitivity of the receiver 10.

Why the arrangement shown in FIGS. 1A and 1B lowers the antenna gain will be discussed specifically with reference to FIG. 2. As shown, when the metal frame 18 is positioned close to and in parallel with the antenna elements *22a* to *22c*, a current Ii is induced in the meal frame 18 by radiation currents Ia, Ib and Ic which flow through the antenna elements *22a*, *22b* and *22c*, respectively. The current Ii is opposite in direction to the currents Ia, Ib and Ic as illustrated and, in this sense, is generally referred to as a mirror current. The resulting magnetic fluxes and therefore the currents cancel each other due to the adjoining antenna elements 22*a* to 22*c* and metal frame 18.

In the light of the above, it is a common practice to increase the distance between the antenna 22 and the metal frame 18 as far as possible or to arrange the antenna 22 and metal frame 18 in a non-parallel position. This imposes restrictions on the arrangement of the various structural elements to and thereby obstructs the miniaturization of a paging receiver, while limiting the design freedom with respect to appearance.

Figure 3:
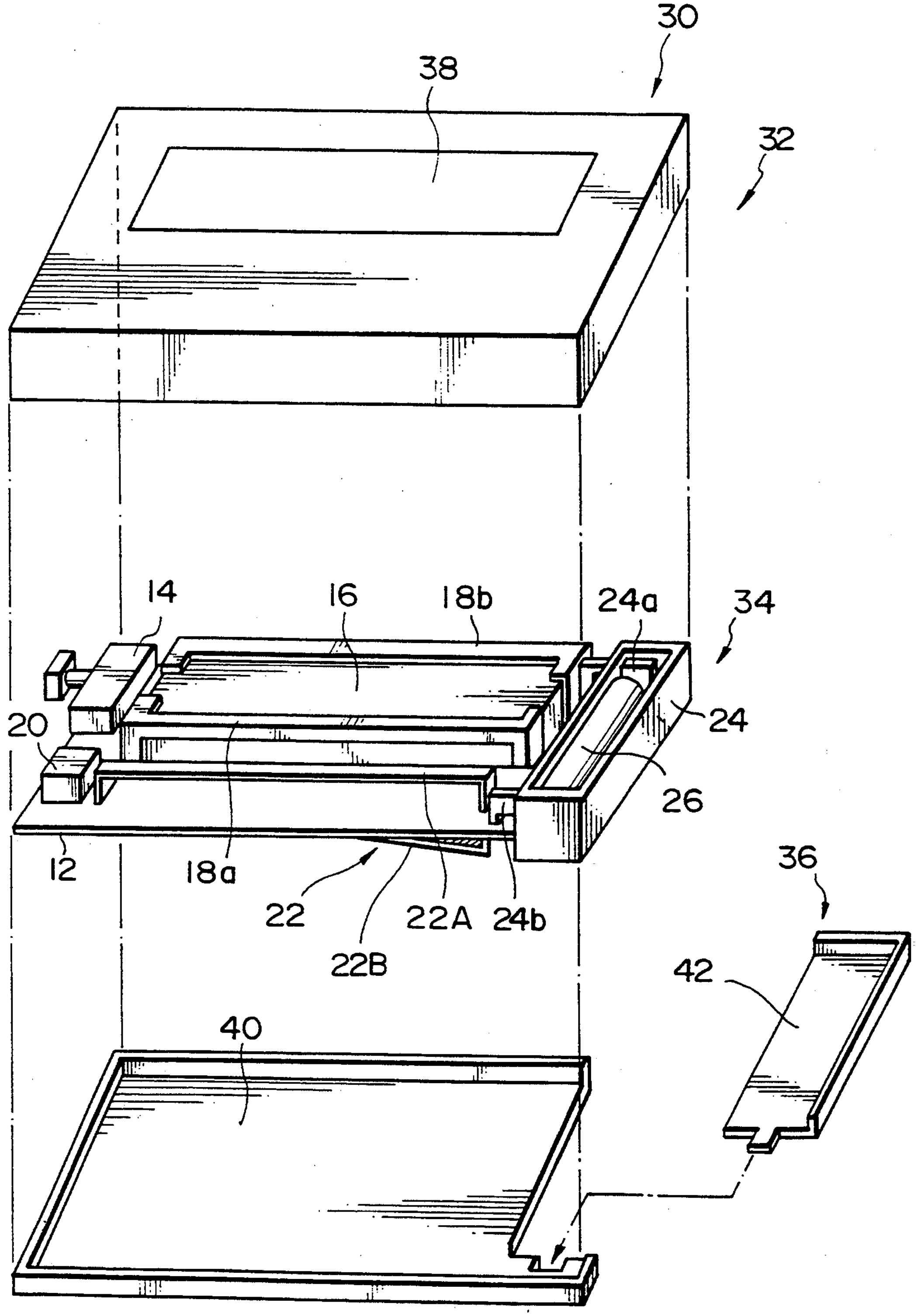
FIG. 3 is an exploded perspective view of a paging receiver having a display embodying the present invention and which belongs to a family of portable radio equipment.

Referring to FIG. 3, portable radio equipment embodying the present invention is shown and implemented as a paging receiver by way of example. In the figures, similar components or structural elements are designated by the same reference numerals, and redundant description will be avoided for simplicity. The paging receiver, generally 30, is made up of a casing 32, a body 34 and a cover 36. The body 34 of the receiver 30 is shown in a plan view in FIG. 4A and in elevations in FIGS. 4B to 4E. Further, an antenna 22 included in the body 34 is shown in a perspective view in FIG. 5. As shown in FIG. 3, the casing 32 is provided with an opening or window 38 for display. The cover 36 is composed of a cover member 40 and a battery cover member 42.

Figure 4A:
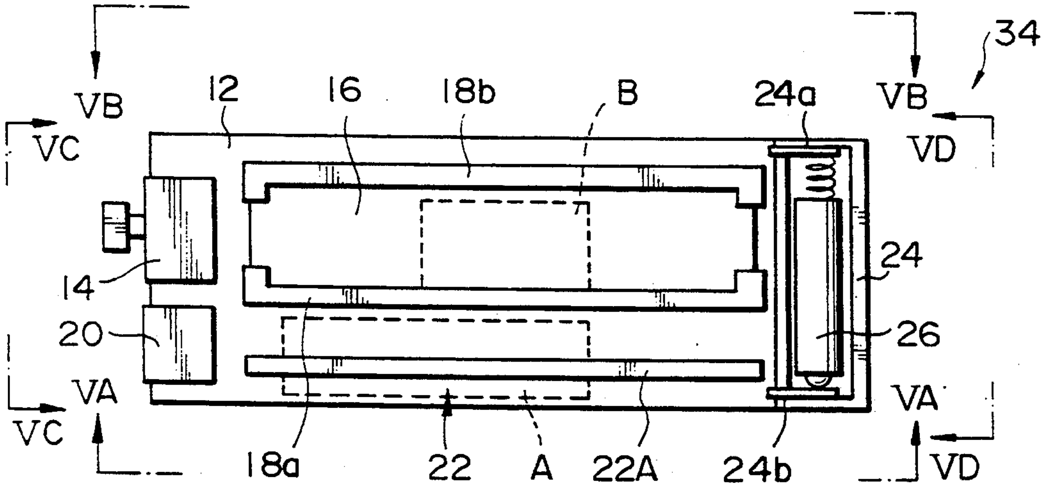
FIG. 4A is a plan view of a body portion of the paging receiver shown in FIG. 3.
Figure 4B:
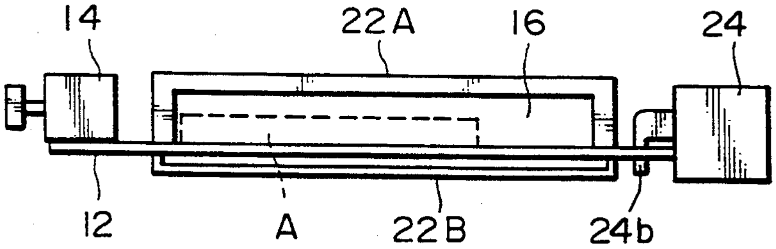
FIG. 4B is a front view as seen in a direction VA—VA of FIG. 4A.
Figure 4C:
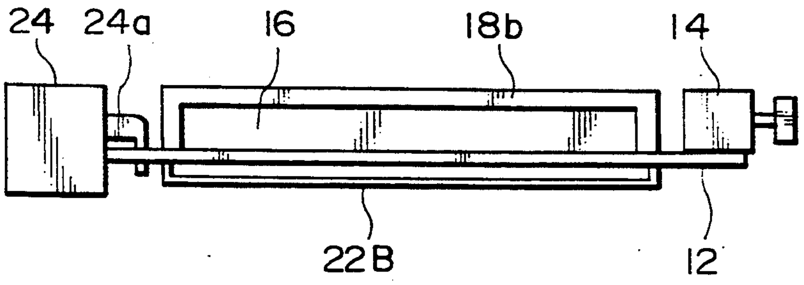
FIG. 4C is a rear view as seen in a direction VB—VB of FIG. 4A.
Figure 4E:
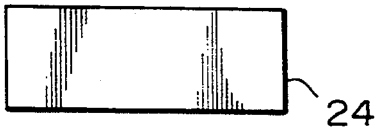
FIG. 4E is a side elevation as seen in a direction VD—VD of FIG. 4A.
Figure 4D:
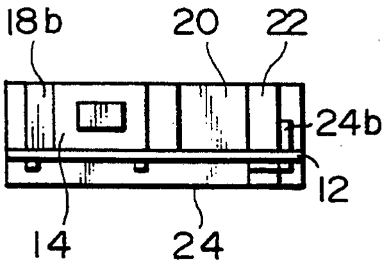
FIG. 4D is a side elevation as seen in a direction VC—VC of FIG 4A.

The body 34 of the receiver 30 will be described in detail with reference to FIGS. 4A to 4E. The body 34 includes a printed circuit board 12 on which are mounted a power switch 14, an LCD or similar display 16 for displaying a message or similar received information, frames 18*a* and 18*b* made of stainless steel, phosphor bronze or similar metal and adapted to fix the display 16, a loudspeaker 20 for alerting a person to an incoming call, and a loop antenna 22 constituted by antenna elements 22A and 22B for efficiently converting an electromagnetic wave into an electrical signal and feeding the electric signal to a high frequency circuit. Located in the vicinity of the printed circuit board 12 is a battery holder 24 which accommodates a battery 26 therein and has terminals 24*a* and 24*b* for connecting the battery 26 to the printed circuit board 12. In FIGS. 4A and 4B, a radio section is labeled A while a decoder section and an LCD drive section which serves as a display are generally labeled B. The radio section amplifies, frequency-converts, and demodulates a high frequency signal coming in through the antenna 22, delivering the resulting received signal to the decoder section. In response, the decoder section feeds information to be displayed on the LCD drive section according to the received signal, and the LCD drive section drives the LCD 16 to display the information.

Figure 5:
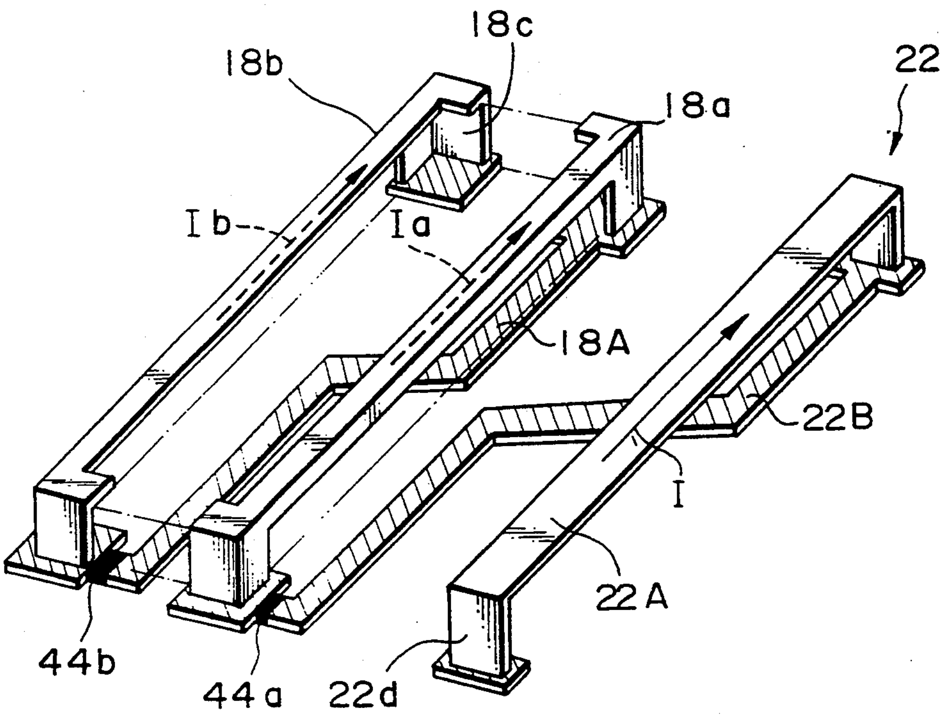
FIG. 5 is a perspective view of an antenna portion included in the paging receiver of FIG. 3.

As stated above, the frames 18*a* and 18*b* of the illustrative embodiment are made of stainless steel, phosphor bronze or similar metal to have sufficient mechanical strength and to enhance dense arrangement of various structural elements. The metal frames 18*a* and 18*b* not only securely support the LCD 16 but also form a part of the antenna 22 themselves. In this sense, each of the metal frames 18*a* and 18*b* serves as a support member and antenna element. As shown in FIG. 5, the antenna 22 is connected to the frame 18*a* by the antenna element 22B, while the frame 18*a* is connected to the frame 18*b* by a connecting element 18A. The antenna element 22A is connected at one end 22*d* thereof to a high frequency amplifying section (not shown) via a matching circuit (not shown). The frame 18*b* constituting an antenna element is connected to ground at one end 18*c* thereof. Further, reactance elements 44*a* and 44*b* are connected in series with the antenna elements, as illustrated. The reactance elements 44*a* and 44*b* cancel the inductance ascribable to the antenna elements 22A, 22B, 18*a* , 18A and 18*b* for thereby promoting conjugate matching with circuitry. In this manner, the antenna elements 22A, 22B, 18*a* , 18A and 18*b* and reactance elements 44*a* and 44*b* form a closed loop, i.e. , the loop antenna 22 of the paging receiver 30.

In the above configuration, assume that a radiation current I has flowed through the antenna element 22A, as indicated by a solid line in FIG. 5. Then, currents Ia and Ib flow respectively in the frame/antenna elements 18*a* and 18*b* in the same phase and direction as the radiation current I, as indicated by phantom lines in the figure. That is, a current opposite in phase to the radiation current as shown in FIG. 2 is eliminated.

It is to be noted that the illustrative embodiment is applicable not only to a frame for fixing a display but also to other various structural elements which are apt to lower the antenna gain.

In summary, it will be seen that the present invention provides portable radio equipment with a display which insures a desirable antenna gain because various structural elements are supported by a support member a part of which plays the role of an antenna element also. To attain a certain antenna gain, the present equipment of the invention reduces the necessary area to be allocated to an antenna, compared to a prior art loop antenna. Hence, the equipment is miniature and easy to maintain.

Various modifications will become possible for those skilled in the art after receiving the teachings of the present disclosure without departing from the scope thereof.

What is claimed is:

1. Radio device including a display, comprising:
   - a display which is exposed at an external surface of said radio device;
   - a first loop antenna;
   - a conductive frame for said display constituting a second loop antenna connected in series with said first loop antenna, said frame supporting said display and also being exposed at said external surface of said radio device;
   - said frame being arranged in close proximity to and substantially parallel to said first loop antenna;
   - said serial connection of said first loop antenna and said frame permitting a radiation current to flow through said first loop antenna and said frame with the same phase and direction in each.

2. Radio device as claimed in claim 1, wherein said first loop antenna comprises a first and a second antenna element constituted by metal members and individually mounted on opposite major surfaces of a printed circuit board of said radio device.

3. Radio device as claimed in claim 2, wherein said conductive support comprises at least two metal frames mounted on one of the opposite major surfaces of said printed circuit board, and a connecting member made of metal and mounted on the other major surface of said printed circuit board for connecting said two metal frames to each other to constitute said second loop antenna.

4. Radio device as claimed in claim 3, wherein said two metal frames constitute respectively a third and a fifth antenna element while said connecting member constitutes a fourth antenna element.

5. Radio device as claimed in claim 4, wherein further comprising at least one reactance element connected in series with said first to fifth antenna elements, said first to fifth antenna elements and said reactance element forming a closed loop.

6. Radio device as claimed in claim 5, wherein a first reactance element is connected between said second and fourth antenna elements.

7. Radio device as claimed in claim 6, wherein a second reactance element is connected between said third and fifth antenna elements.

8. Radio device as claimed in claim 7, wherein said first reactance element is connected in series between said second and third antenna elements, and said second reactance element is connected in series between said fourth and fifth antenna elements.

9. Radio device as claimed in claim 1, wherein said radio device comprises a paging receiver.

10. Radio device as claimed in claim 1, wherein said radio device comprises a paging receiver.

11. Radio device including a loop antenna and a display, comprising:

a support frame arranged in close proximity to and substantially parallel to said loop antenna for supporting said display on a printed circuit board of said radio device, said support frame and display being exposed for being viewed at an exterior surface of said radio device, said support frame including first and second conductive frames mounted on said printed circuit board, said first conductive frame being connected to said loop antenna; and a connecting arrangement mounted on said printed circuit board for electrically connecting said first and second conductive frames to each other, said support frame and said loop antenna being connected in series so as to permit a radiation current to flow through said support frame and said loop antenna with the same phase and direction in each.

12. Radio device as claimed in claim 11, further comprising a reactance element connected between said second conductive frame and said connecting arrangement.

13. Radio device as claimed in claim 11, further comprising a reactance element connected between said first conductive frame and said loop antenna.

14. Radio device as claimed in claim 11, further comprising a reactance element connected between said first conductive frame and said second conductive frame.

* * * * *

UNITED STATES PATENT AND TRADEMARK OFFICE

CERTIFICATE OF CORRECTION

PATENT NO. : 5,408,699

DATED : April 18, 1995

INVENTOR(S) : M. Yamashita, et al.

It is certified that error appears in the above-indentified patent and that said Letters Patent is hereby corrected as shown below:

On the title page of the above-identified patent, at item [21], change "327,249" to --777,491--.

Signed and Sealed this

Twelfth Day of September, 1995

Attest:

BRUCE LEHMAN

*Attesting Officer*

*Commissioner of Patents and Trademarks*